United States Patent [19]

Cobb

[11] Patent Number: 4,896,101
[45] Date of Patent: Jan. 23, 1990

[54] METHOD FOR MONITORING, RECORDING, AND EVALUATING VALVE OPERATING TRENDS

[76] Inventor: Harold R. W. Cobb, P.O. Box 078811, West Palm Beach, Fla. 33407

[21] Appl. No.: 265,261

[22] Filed: Oct. 31, 1988

Related U.S. Application Data

[63] Continuation-in-part of Ser. No. 937,402, Dec. 3, 1986, abandoned.

[51] Int. Cl.[4] .................... G01R 31/02; G01M 13/02; G01M 19/00
[52] U.S. Cl. .................................... 324/73.1; 73/168; 73/593
[58] Field of Search .................... 324/73 R, 158 R; 73/168, 587, 591, 593

[56] References Cited

U.S. PATENT DOCUMENTS

| | | |
|---|---|---|
| 1,449,458 | 3/1923 | Sutermeister . |
| 2,477,395 | 7/1949 | Sunstein . |
| 3,095,532 | 6/1963 | Floyd .................................... 73/593 |
| 3,130,581 | 4/1964 | Schulman . |
| 3,416,630 | 12/1968 | Pohl et al. .......................... 73/593 |
| 3,779,457 | 12/1973 | Cornyn, Jr. et al. . |
| 3,839,628 | 10/1974 | Higgins et al. . |
| 4,002,065 | 1/1977 | Lardi et al. . |
| 4,057,714 | 11/1977 | Fork et al. . |
| 4,155,116 | 5/1979 | Tawfik et al. . |
| 4,202,209 | 5/1980 | Holmes . |
| 4,364,111 | 12/1982 | Jocz . |
| 4,408,294 | 10/1983 | Imam .................................... 73/593 |
| 4,455,012 | 6/1984 | Gupta . |
| 4,646,556 | 3/1987 | Courcoux et al. . |
| 4,649,743 | 3/1987 | Sugimoto et al. ............... 73/593 |
| 4,682,491 | 7/1987 | Pickard . |
| 4,690,003 | 9/1987 | McNennamy et al. . |
| 4,694,693 | 9/1987 | Gerlowski . |

Primary Examiner—Ernest F. Karlsen
Attorney, Agent, or Firm—Steele, Gould & Fried

[57] ABSTRACT

Briefly, the invention contemplates a method for monitoring and evaluating the performance of machines such as electro mechanically or pneumatically driven valves. Further, the method includes evaluation of motor driven pumps. The constant power factor is obtained from signals representative of the voltage supply the current supplied to the valve driver. This is representative of the power consumed. Also, the mechanical noise level during the single stroke valve actuation or start-up cycle pump actuation is monitored simultaneously with electrical current flow and also fluid flow noise downstream of the device before and after the valve is seated. The temperature of the electric motor driver is also measured synchronously with the current measurements to monitor for any appropriate change in power factor. A change in the power factor is indicated by changes in the temperature of the motor winding and the change of the winding resistances. The power, temperature and noise are reported collectively and individually by a series of plots or displays showing the parameters measured or computer against a synchronized time line. The trend of any changes in the parameters is shown.

7 Claims, 2 Drawing Sheets

METHOD FOR MONITORING, RECORDING, AND EVALUATING VALVE OPERATING TRENDS

This is a continuation-in-part of U.S. patent application Ser. No. 937,402, filed Dec. 3, 1986, now abandoned.

BACKGROUND OF THE INVENTION

This invention pertains to an improved method and apparatus for monitoring, recording, and analyzing the performance of electric motor-operated pumps and valves and pneumatically operated valves. It more particularly relates to the identification and monitoring of a valve's movement and related characteristics during a start-up or single stroke opening and closing cycle, and of its characteristics during a single stroke shutting off and opening up cycle.

A prior art approach to measuring and monitoring various characteristics of a machine or valve is to use a variety of transducers and micro switch position monitors with analog and discrete output signals associated therewith. Often in the power industry the performance of a valve is principally established by its time to open or close. Decisions relating to the repair and replacement of a valve are most commonly made by independent evaluation of its stroke time and evaluation of seat or stuffing box leakage.

These prior art approaches suffer the disadvantages of requiring many modifications and attachments to a pump or valve. These modifications and attachments are cumbersome, expensive and sometimes intrusive upon the mechanical performance. If left in place, the monitoring devices are subject to damage and drift. The resulting data obtained during the test program on the movement of the pump or valve do not in some instance represent the service conditions of the valve. For example, in valves inside the containment of a nuclear power plant, the condition of a particular valve and pump with repsect to flow through the device, temperature of the device or the driver for the valve, and pressure are often not simulated during a testing cycle but rather are tested by normal plant operation or during accident situations. The internal atmosphere and conditions inside the nuclear containment often present a physical barrier and restrict access to individual line and prohibit the placement of measurement devices. Even in the case where a measurement of a pump or valve parameter is possible in the prior art, such individual ad hoc events are precluded or were restricted when compared to the optimum action of analyzing or comparing the trend of the pump or valve's performance under varying plant conditions. The limitations imposed on currently available instrument penetrations in Light Water Nuclear Reactor plants also present a physical, and sometimes a signal impenetrable, barrier to measuring many parameters of a valve's performance during operation.

In addition to attempting to monitor the conditions of a valve or pump during a prescribed operational process, there is also a need to protect the device against damage due to overload, improper adjustment and the like. The prior art methods with respect to motors and apparatus, which rely on measurements of the electrical current or average power consumption of the valve driver or pump motor, may be subject to greater variations than those caused by an abnormality. In other cases, the peak power consumed by the motor/driver may not change significantly in the presence of a deviation from a normal operation parameter of the pump or valve when the current and average power consumption show such a deviation. In addition, current actuated devices used in the prior art are insensitive to power changes at constant voltage which are manifested as changes in power factor.

U.S. Pat. No. 4,690,003 to McNennamy et al. discloses a motor operated valve analysis and testing system. This system requires a mechanically intrusive device placed inside the valve. The method also includes a multiple stroke analysis in order to determine the operating characteristic of the valve. The current supplied to the valve driver is monitored. However, the torque of the valve is measured by the mechanically intrusive device. U.S. Pat. No. 4,646,556 to Courcoux et al. discloses a process and apparatus for testing a pilot operated safety valve. A mechanically intrusive device is used in conjunction with the hydraulically actuated valve to measure the pressure in the hydraulic supply line to the valve. Also, force generated by the valve is measured by another device. The force and pressure are plotted against time. U.S. Pat. No. 3,779,457 to Cornyn, Jr. et al. discloses a data normalizing method for hydraulic steering pumps. The system measures the speed of the motor driving a pump, the hydraulic fluid temperature at the pump outlet, the pressure of the fluid, the flow rate and the back pressure. This information is synchronized with respect to time and displayed. U.S. Pat. No. 4,002,065 to Lardi et al. discloses a steam turbine valve positioning system that monitors flow through a valve versus valve lift. U.S. Pat. No. 4,694,693 to Gerlowski discloses a system for testing check valves using pressure sensors in the lines. U.S. Pat. No. 2,477,395 to Sunstein discloses an apparatus for continuously predicting a trend in observed data by utilizing a mechanical vice computing the root means square of variation of data applied to the device. U.S. Pat. No. 4,455,012 to Gupta discloses a remotely controlled valve that is controlled by a microprocessor. The current of the motor drive for the valve is sensed and a timing circuit ignores starting surges. U.S. Pat. No. 4,364,111 to Jocz discloses an electronically controlled valve actuator that senses the torque feedback from a valve driver. An optical sensor on the valve generates an input signal to a microprocessor indicative of the position of the valve. The torque is measured by strain gauges attached to the motor output shaft. U.S. Pat. No. 3,839,628 to Higgins et al. discloses a method and apparatus for analyzing and monitoring the performance of machines and processes driven by electrical motors. The current supplied to the electrical motor is monitored as well as the voltage across the power supply lines running to the motor. A power factor is obtained based upon the voltage current. U.S. Pat. No. 1,449,458 to Sutermeister discloses an apparatus for manufacture of ice cream which detects the current applied to the motor turning the paddles in an ice cream maker. U.S. Pat. No. 4,155,116 to Tawfik et al. discloses a digital control system including built in test equipment. The system is responsive to analog and discrete input signals and for generating test signals. U.S. Pat. No. 4,057,714 to Fork et al. discloses a durability or service-life monitoring device for a turbogenerator shaft. The current generated by a turbine driven generator and the voltage across the generator output lines are applied to a circuit which develops a power factor. A device sensing the angle of the turbine blades provides an indication of the torque generated by the turbine and applied to the generator. The torque and the power factor are used in a control circuit. U.S. Pat. No. 3,130,581 to Schulman discloses a torque and speed measuring instrument. Torque is calculated based upon the alternating current applied to a torque generator. U.S. Pat. No. 4,682,491 to Pickard discloses an apparatus and method for testing prosthetic heart valves. This device measures flow and pressure from the implantable pump in the heart valve. U.S. Pat. No. 4,202,209 to Holmes discloses a shock suppresser valve test system and method. The velocity of the fluid flowing to the shock suppresser is used in the system. The velocity is an indication of the required flow rate within the shock suppresser necessary to close the shut-off valves.

OBJECTS AND SUMMARY OF THE INVENTION

A general object of this invention is to provide a method which economically and reliably overcomes the aforementioned problems of the prior art and, in particular, permits a series of comparative measurements of the performance characteristics or parameters of a pump or valve that permits subsequent or simultaneous evaluation of trends in performance by comparing the consumption of energy, the thermal conditions of the device, and the noise levels based upon movement of mechanical mechanisms in the device and based upon fluid passing through seals and seats of the device.

More specific objects of the invention include monitoring for changes in the equivalent energy consumption pattern, changes in noise of driving and driven parts, and changes in temperature of the driving motor or pump bearings, also changes in the time for singly cycle stroking to close or cycle to fully open the valve stem, or start up cycle time to obtain optimum flow from a pump, and to establish the leak tightness characteristics of valves in nuclear power plants, especially valves and pumps used occasionally in safety systems.

Another object of the invention is to monitor and compare changing patterns of noise in pneumatically actuated valves during an opening and closing cycle to permit comparative analyses of the valve parameters and project trends in performance from those measured parameters for all mechanical parts in addition to the valve seals and seats.

Briefly, the invention contemplates a method for monitoring and evaluating the performance of machines such as electro mechanically or pneumatically driven valves. Further, the method includes evaluation of motor driven pumps. The instantaneous current consumed (i), the rate of current consumed (di/dt) and the changes in rate of current consumed ($d^2i/dt^2$) by the valve driving motor are monitored at small discrete time increments over the full actuation time of the stroke to open or close the valve. The constant power factor is obtained from signals representative of the voltage supply the current supplied to the valve driver. This is representative of the poewr consumed. Also, the mechanical noise level during the single stroke valve actuation or start-up cycle pump actuation is monitored simultaneously with electrical current flow and also fluid flow noise downstream of the device before and after the valve is seated. The temperature of the electric motor driver is also measured synchronously with the current measurements to monitor for any appropriate change in power factor. A change in the power factor is indicated by changes in the temperature of the motor winding and the change of the winding resistances. The reaction effect of various events such as the rate and change in torque power as related to the rate of current consumed, the noise which reflects the sliding movement of driven parts of the valve, and the temperature of the motor are correlated and reported collectively and individually by a series of plots or displays showing the parameters measured or computed against a synchronized time line. The trend of any changes in the parameters is shown by comparing the aforementioned parameters at any instant in time against instantaneous values (actual value), rate of change in values (first derivative), and the incremental and total areas under the curves of current (or power), noise, and temperature against time. Trends are detected by iterative comparison of single stroke opening or closing valve data, or comparison of start-up cycle pump data. Trends can be detected by subjecting the data to known mathematical formulas such as Fourier analysis or other wave form detection schemes.

The invention also establishes the stroke time of a valve by recording plots of the noise cycle during a single stroke valve cycle. The noise is generated by movement of the valve spindle and valve driving motor system. Noise analysis also permits a qualitative assessment of the leak tightness of the gland seals and of the valve seat during single stroke cycles. These are two improotant test parameters that are required to be measured periodically on certain motor operated valves in nuclear power plant safety systems.

The use of the present invention permits the monitoring of the peformance of valves in nuclear power plant safety systems designated as important or critical valves in the system by establishing, recording, plotting and comparing real time data. Such designated valves are required to immediately move to mitigate the consequences of an accident. The designated valves normally are fully open (or fully shut, as required) and must completely close in a one time single stroke action (or open) during actuation of the safety system. Failure of the designated valves, defined as slow closure or slow opening times or other objective standards, could be fatal to the operation of the safety system. Likewise, pumps, normally inactive but called into operation during a safety system actuation, must perform satisfactorily during a start-up cycle, i.e., that cycle necessary for the pump to move an optimal amount of fluid. As an aid to understanding typical requirements for a nuclear valve's performance, government regulation directs that those valves which are only required to perform in the event of an accident be tested by stroking periodically. Separately, the regulations may also require seat leakage of the valve to be measured. Currently, the primary characteristic to measure valve performance is the stroke time. This invention permits all the aforementioned parameters to be included in the evaluation of the valve's capability to perform in the event of an emergency. On such nuclear valves specifically, and all valves generally, the invention provides data for decisions on valve and pump maintenance procedures and replacement. The data is based upon changes in valve or pump performance.

BRIEF DESCRIPTION OF THE DRAWINGS

The foregoing and other objects and advantages of the invention will appear more fully hereinafter from consideration of the detailed description of the preferred embodiments and the drawings which follow.

DETAILED DESCRIPTION OF THE PREFERRED EMBODIMENTS

Figure 1:
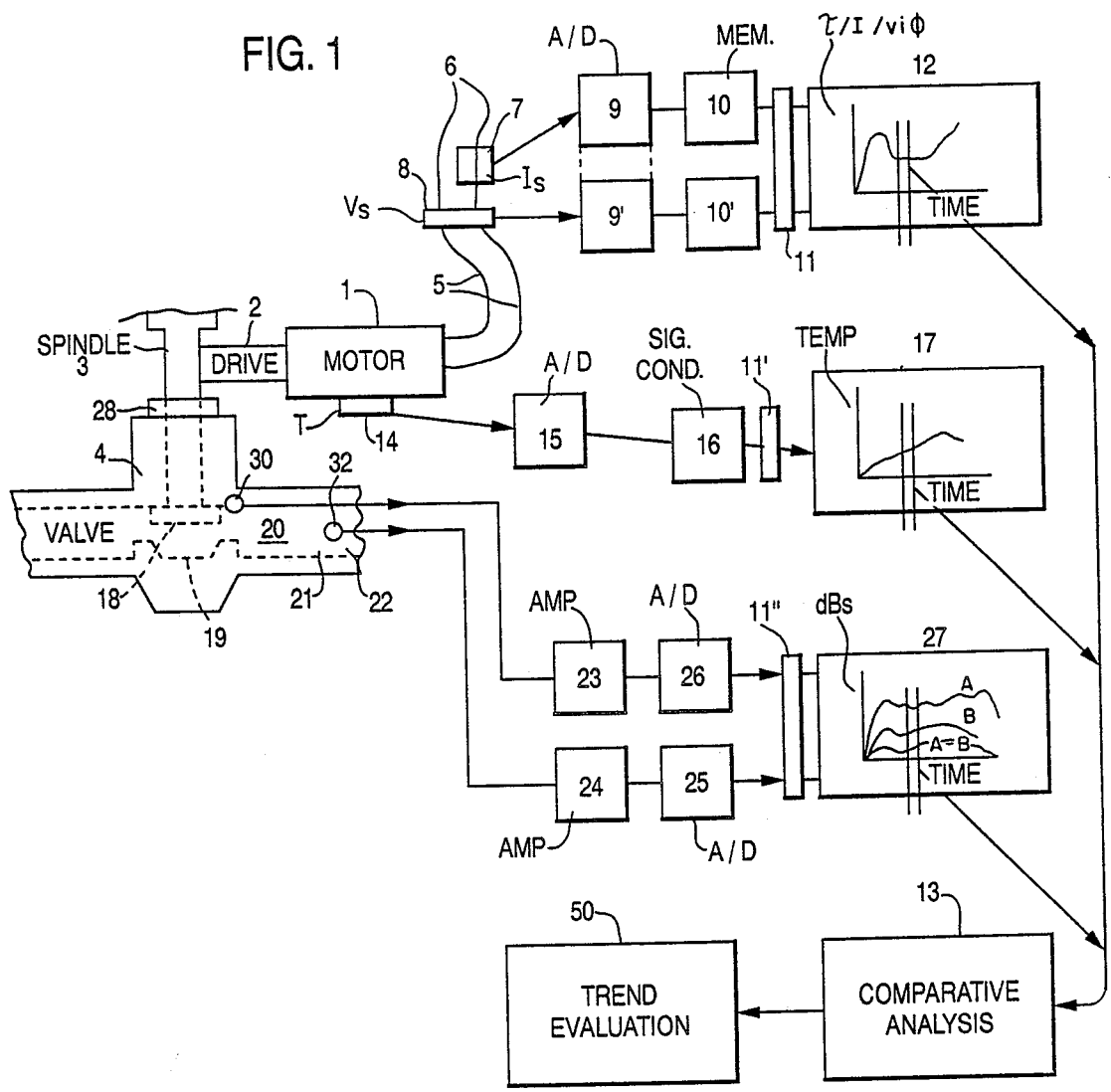
FIG. 1 substantially illustrates the valve operating trend evaluation in accordance with the principles of the present invention.

Referring to FIG. 1, an electric motor has its drive 2 coupled to the spindle 3 of a valve 4. The valve could by any other machine which is connected to and operated by an electric driver motor. The electric power supply for the motor can be alternating or direct current and for alternating current may be three phase or single phase supply. Leads 5 couple the electric power supply 6 to the motor 1. A measurement is made of the instantaneous power based upon signals from voltmeter 8 ($V_s$) and current meter 7 ($I_s$) or the effects of torque on the valve spindle 3 as indicated by the exciter current applied to the motor. One skilled art employs Hall effect devices for such measurement; another skilled art uses operational amplifiers to measure and multiply the instantaneous current and voltage. In the illustrative embodiment of FIG. 1, a current sensing transducer 7, herein called an "amp transformer", is used to measure the exciter current from the power supply 6 through the conducting leads 5 connected to motor 1. This sensing of current is non-intrusive with respect to the valve.

Valve electric motors are most often synchronous motors or direct current motors. Further to the embodiment illustrated herein and for purposes of clarity, measurements of torque are based upon the exciter current measured by sensor 7. It would be equally effective to measure the instantaneous power; however, for this description and since the essence of this invention is comparative analysis of valve data, it is sufficient to say that the rate of current (di/dt) supplied to the motor driver is monitored. Also at this point in regard to the logics of the system, it is sufficient to state that the instantaneous readings are stored digitally for flexibility. To this end, the output of the amp transformer 7 is digitally converted in an analog to digital (A/D) converter 9, 9' and stored digitally in memory 10, 10' and processed in device 11. Device 11 preferably is a computer executing an appropriate program to generate data relating to torque (L), current (I) and/or a power factor ($Vi\phi$). Typical output displays would record, at any time, the power/current/torque effect against time during the single stroke movement of the valve disc 18. Comparative analytical data would be developed in function block 13. Trend evaluation occurs in function block 50.

Temperatures would be monitored from thermocouple (T) 14 clamped onto motor 1. The signals from T14 are digitized at A/D 15, conditioned in 16, processed in 11' and displayed at 17 with an analog type display which is time synchronized with display 12. Comparative analysis of the temperature and power parameters occurs at function block 13.

The intent of the invention is monitoring the noise of the valve 4, as the spindle 3 moves to close (or conversely to open, as the case may be) the valve disc 18 upon the valve seat 19, is to characterize such noise for comparative analysis from single stroke to single stroke as the valve moves to fulfill its function. To do this, piezo electric sensors 30, 32, respective, are attached to the valve bonnet 20 and on piping 22 at a position downstream of the valve 21 near the point in the valve that forms a continuing flow path for the fluid after it leaves the seat 19. The noise signals are fed in separate channels, i.e., separate lines, to amplifiers 23 and 24, digitized in A/D converters 25 and 26 and processed at 11" to give outputs representative of decibels in display 27. The noise outputs are time synchronized to the outputs of the torque/current/power and temperature monitors 12 and 17. All of the outputs are comparatively analyzed in function block 13. Additional noise level processing at 11" subtracts the noise signal A on sensor 21 from the noise signal B on sensor 20. The difference of these two signals, after synchronization with the torque/current/power and temperature outputs confirm completion of the stroke cycle time. This confirmation of valve closure is a qualitative measure of the performance and indicator of the tightness of the disc 18 on the seat 19 when the valve is in the closed position and/or of the gland leakage in the stuffing box 28. It is an important feature of the invention that the noise of a valve movement during the close or open cycle, especially in the case of pneumatic or hydraulic operated valves, the synchronized with time and with respect to the power and temperature data to indicate the stroke time and provide comparative plots of valve data from test to test in order to compare the instantaneous values against real time increments and the area under the whole curve or at discrete time intervals.

Processing function blocks 11, 11' and 11" in FIG. 1 are incorporated into a single processor such that time synchronization occurs between the torque, current or power factor (shown in display 12), the temperature (shown in display 17) and the noise characteristics of the valve (shown in display 27). Comparative analysis function block 13 obtains a power characteristic based upon torque, electrical current, or power factor, and corrects that power characteristic based upon the temperature data. It is well known that the temperature of the windings of motor 1 affects the resistance of those windings and, hence, the power is affected by this temperature measurement. Comparative analysis block 13 produces the corrected power factor. Further, a confirmation of the end of the single stroke for the valve occurs in comparative analysis block 13. To make this confirmation of valve closure (or valve opening), the power factor, whether corrected or not, is correlated to the noise detected by sensors 30, 32. When the power factor reaches a zero or base level, and the noise level, particularly from sensor 30, reaches a base level, a confirmation of valve closure is noted. By monitoring the signals developed from noise sensor 32, a determination can be made of leak tightness of the valve.

Trend evaluation block 50 evaluates the instantaneous power, temperature, and noise characteristics, evaluates the first and second derivatives of that data and compares single stroke data obtained at one time to single stroke data obtained at a second time wherein the time span between the first stroke and the second stroke spans hours, days or years. In other words, these valves are typically operated only in single stroke cycles. Customarily they are maintained, for example, in a open state and then upon the occurrence of certain conditions, the valves are controllably closed. If the valves are used in safety systems, it is imperative that the valves close (1) in a prescribed period of time and (2) that the valves seal or seat properly within that time period. It is known in the art that if a valve is stroked numerous times, opened and closed three, four or five times and data is obtained for each stroke cycle in that repetitive series, the data is normalized and the valve becomes somewhat "self-lubricating". In safety systems, the valves cannot be stroked three, four and five times before the valve is properly closed. the valve must be closed on the first stroke within a prescribed period of time. Conversely, if the valve is to be opened during the single stroke, similar concerns arise.

In the present invention, single stroke cycle data is obtained on, for example, day one. The valve may not be stroked against for 24 oro 48 hours. On day three, the valve is stroked again through a single open or close cycle and the data from the second stroke time is compared in trend evaluation function block 50 against the data from the first stroke time. If, after six months or a year, the valve is then checked again, the single stroke data could be compared against the stroke one and stroke two data. Thus, trend evaluation function block 50 includes some type of memory device that records and compares the power consumption data, temperature, and noise data. Furthermore, trend evaluation function block 50 can evaluate the data using mathematical formulas, such as Fourier transforms and waveform analysis. The waveform analysis can operate on single stroke data or multiple stroke data obtained over a period of time.

Figure 2:
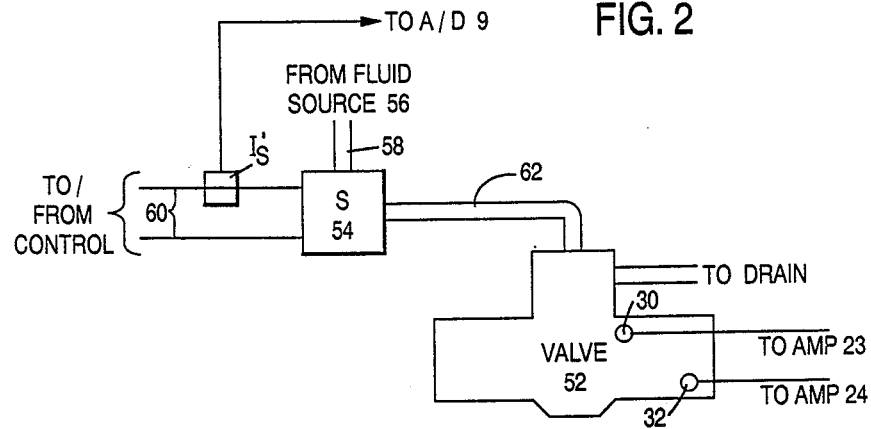
FIG. 2 schematically illustrates a pneumatically or hydraulically operated valve and the location of the sensors.

FIG. 2 schematically illustrates hydraulic valve 52 that is supplied with an hydraulic or pneumatic control signal from solenoid 54. The hydraulic or pneumatic fluid is obtained from source 56 via supply line 58. Solenoid 54 is controlled by a control voltage and control current over lines 60. The control current is sensed by current sensor $I_s'$ and the representative signal is applied to A/D converter 9 in FIG. 1. Upon the occurrence or removal of the current/voltage, solenoid 54 opens/closes the supply of fluid sent to valve 52 via line 62. The valve then opens or closes depending upon the appropriate hydraulic or pneumatic control signal. Noise sensors 30, 32 are respectively positioned near the seat and at a position downstream of the seat to detect mechanical noise at two different locations in the valve. The signals from sensors 30, 32 are respectively applied to amps 23 and 24 in FIG. 1. From the current signal and the two noise signals, a power parameter can be calculated and the leak tightness and a confirmation of valve closure can be obtained as discussed above with respect to the system schematically illustrated in FIG. 1.

Figure 3:
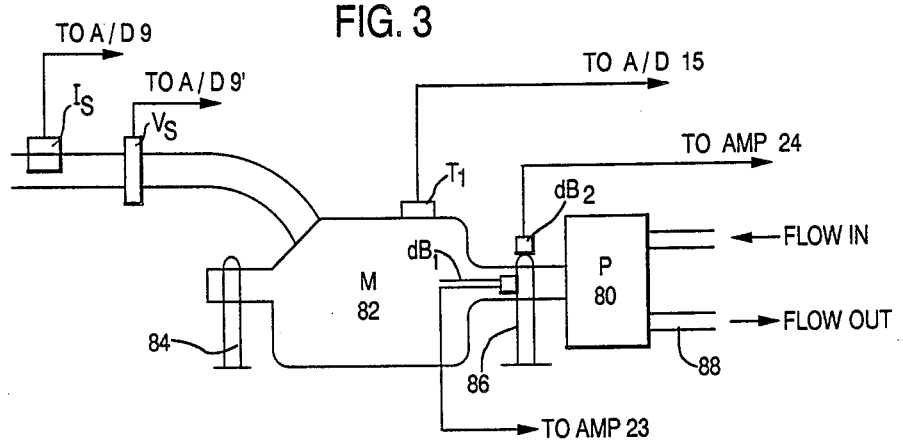
FIG. 3 schematically illustrates a motor driven pump and the placement of the sensors thereon.

FIG. 3 illustrates analysis of pump 80 that is driven by electrical motor 82. Motor 82 is mounted on bearings within stands 84 and 86. Noise sensors $dB_1$ and $dB_2$ are positioned near the bearing in stand 86. The noise sensors are disposed 90° apart about the bearing within stand 86. Motor 82 is supplied with electrical power and this power is sensed by current sensor $I_s$ and the voltage is sensed by voltage $V_s$. Signals from the sensors are respectively applied to A/D converter 9, 9'. The temperature of the windings of motor 82 is sensed by thermocouple $T_1$. The signal from $T_1$ is applied to A/D converter 15. The signal obtained from noise sensors $dB_1$ $dB_2$ are respectively applied to amps 23 and 24.

The start-up cycle for motor 82 is the critical cycle that is analyzed in this invention. The start-up cycle of motor 82 and pump 80 begins when the motor is turned on and ends when the optimum flow is achieved on output line 88. Again, if motor and pump set 80, 82 is only occasionally used, such as in a safety system, the motor and pump must produce an optimum flow within a certain time period. If the motor and pump set is dormant for a significant period of time, the operators do not have enough information regarding maintenance and repair of the pump. The present invention detects power characteristics, temperature characteristics and noise characteristics by monitoring the start-up cycle of the pump and motor set at various times. The noise sensors are disposed at a approximately 90° with respect to each other over the bearings between the drive shaft between motor 82 and pump 80 in order to determine whether the motor and/or pump must be replaced.

Figure 4:
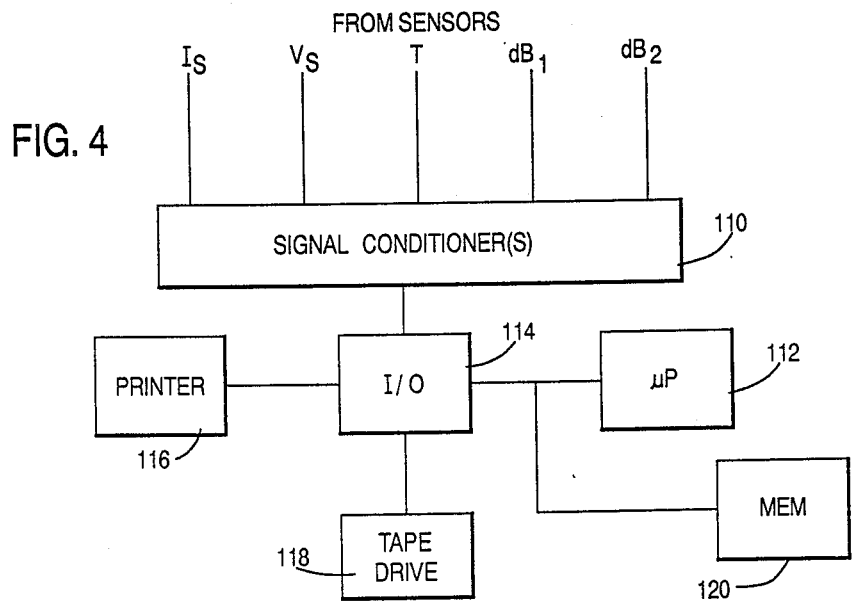
FIG. 4 schematically illustrates the computer system utilized in the present invention.

FIG. 4 schematically illustrates the computer system that is capable of conditioning and processing these signals. Signals are obtained from current, voltage, temperature and the two noise sensors and applied to signal conditioners shown in signal conditioner block 110. These signal conditioners could include amplifiers and most likely would include A/D converters. Some of the sensors currently available include analog to digital converters and amplifiers. In that instance, the signal conditioner coupled to a particular incoming data line would include amplifiers or various other features that enable microprocessor 112 to obtain the data from the sensor and process it accordingly. The computer system includes input/output device 114 that typically includes a buffer system for the incoming data signals from signal conditioner 110 as well as additional buffer and control characteristics for printer 116 and tape drive 118. Input-/output device 114, printer 116 and tape drive 118 are controlled by microprocessor 112. Microprocessor 112 executes programs, such as waveform analysis, based upon the signals stored in memory 120. Memory 120 stores the instantaneous signals and then the other data derived from those signals. For example, the microprocessor could operate on the power signal and the temperature signal to obtain a corrected power signal based upon the temperature of the windings of the motor. Further, the microprocessor time synchronizes all the raw data and time synchronized plots on printer 116. Essentially, printer 116 designates displays 12, 17 and 27 in FIG. 1. Microprocessor 112 embodies processing devices 11, 11', 11'', comparative analysis function block 13, and trend evaluation function block 50 in FIG. 1. Tape drive 118 is utilized principally to collect the raw data. In one working embodiment, the computer system illustrated in FIG. 4 is very compact and is placed in a briefcase. The tape drive places the raw data on a magnetic tape such that the tape can be brought to a larger computer for further comparative analysis. In this embodiment, the current, voltage, temperature and noise sensors are placed at or near the valve without disassembling the valve or placing any intrusive device into the system. Hence, the present invention is highly portable and does not disrupt the existing physical conditions of the valve driver, that is the motor, and the valve. The noise sensors are placed on the outside of the valve being studied. The current sensor is typically placed around the power cable. Otherwise, most valves have test points in their electrical control systems wherein signals representative of current supplied to the valve drive and voltage supplied to the valve driver can be obtained. The temperature sensor is placed on the outside of the valve driver. Hence, the present invention is not intrusive into the system. Further, the invention is extremely portable.

What is claimed is:

1. A method for analyzing changes in the performance of a valve operated in a single stroke by a driver comprising the steps of:
   obtaining a first parameter indicative of the electrical current delivered to the driver during the single stroke;
   obtaining a second parameter indicative of the temperature of said driver during the single stroke;
   obtaining a third parameter indicative of the noise generated by said valve during said single stroke;
   modifying said first parameter with said second parameter in accordance with a predetermined formula to obtain a corrected power parameter;
   obtaining a synchronized record of said corrected power parameter and said third parameter for a predetermined period during a full stroke opening or closing action of said valve to permit qualitative assessment of said single stroke.

2. A method for analyzing the performance of a valve as claimed in claim 1 including the step of repeating all the steps after a lengthy predetermined period of time and subsequently comparing a plurality of single stroke data.

3. A method for analyzing the performance of a valve as claimed in claim 1 wherein the assessment produces an indication of leak tightness of said valve.

4. A method for analyzing the performance of a valve as claimed in claim 1 including the steps of:
   obtaining a fourth parameter indicative of the noise generated by the flow of fluid downstream of said valve; and,
   wherein said step of obtaining a synchronized record provides a confirmation of the end of the stroke and said assessment produces an indication of leak tightness based upon said fourth parameter at a time subsequent to said end of stroke.

5. A method for analyzing the performance of a valve as claimed in claim 1 wherein said driver is an electrically powered motor and said first parameter is characteristic of the power consumed by said motor during the single stroke of said valve and said power parameter is modified and corrected by obtaining the temperature of motor windings during said single stroke.

6. A method for analyzing the performance of a valve as claimed in claim 1 including the steps of providing baseline data by analyzing the performance of said valve at a first time, repeating said analysis at a second time, iteratively comparing said first, second, corrected power and said third parameters respectively obtained at said first and second times, and establishing trends of said parameters.

7. A method for analyzing the performance of a valve as claimed in claim 1 wherein the steps of obtaining the parameter are non-invasive with respect to said valve and said driver and a power supply coupled to said driver.

* * * * *